Inventor
Frederick T. Fereday
By Geo. P. Kimmel
Attorney

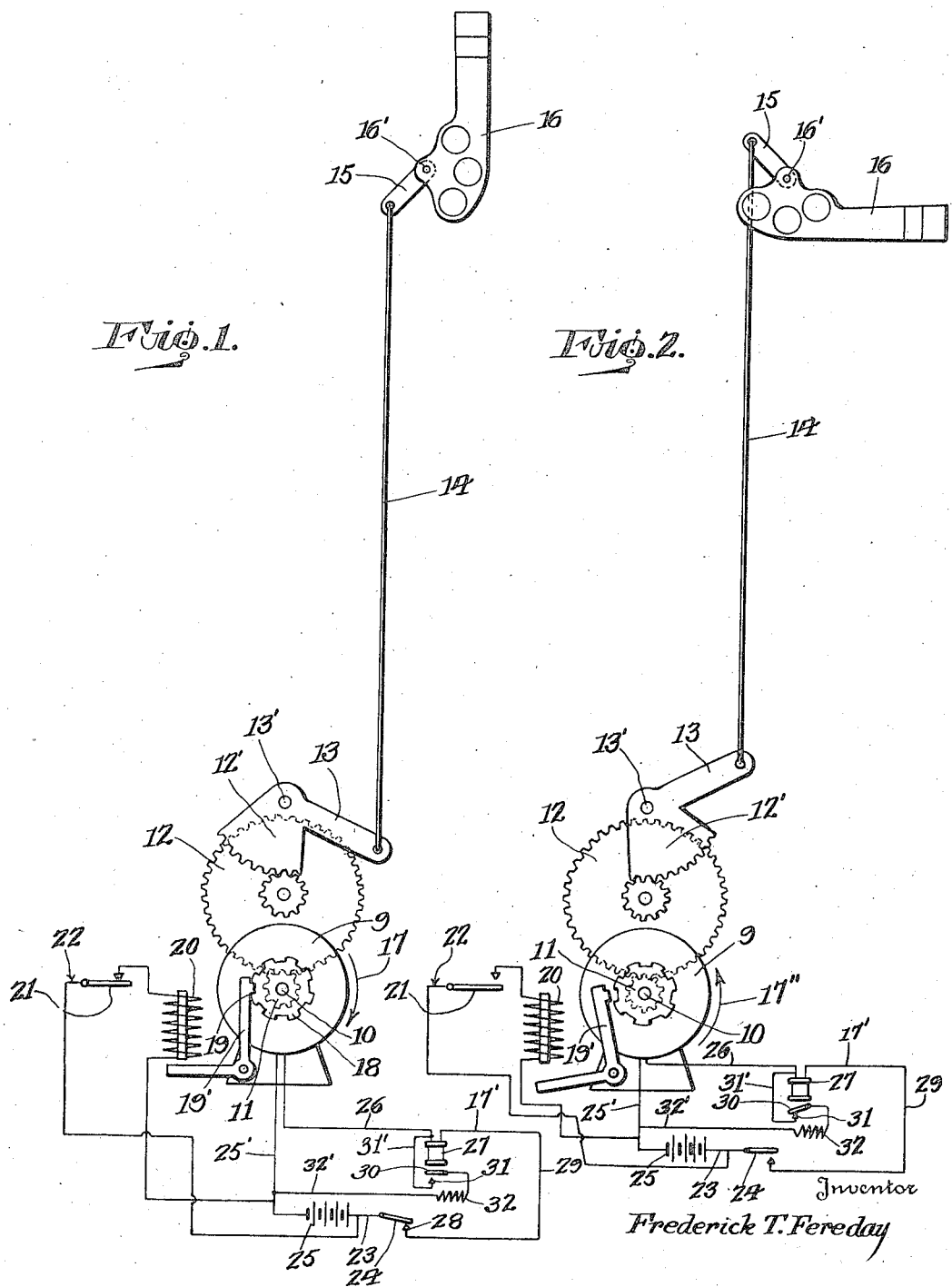

April 21, 1936.　　　　F. T. FEREDAY　　　　2,038,482
ELECTRICAL SNUBBING MEANS
Filed April 21, 1934　　　3 Sheets-Sheet 3
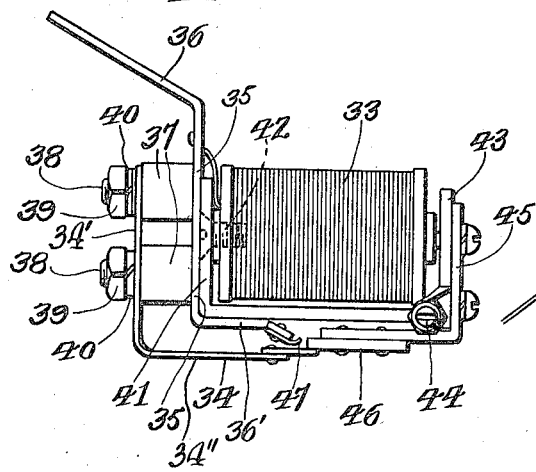
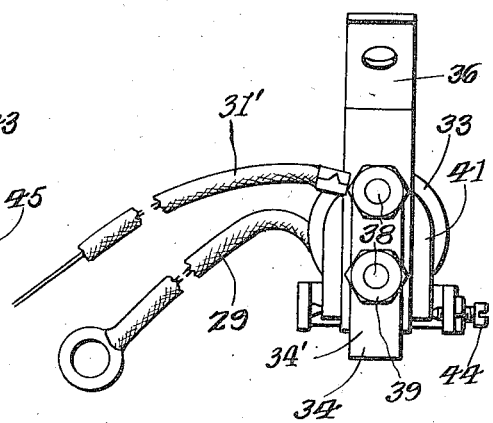
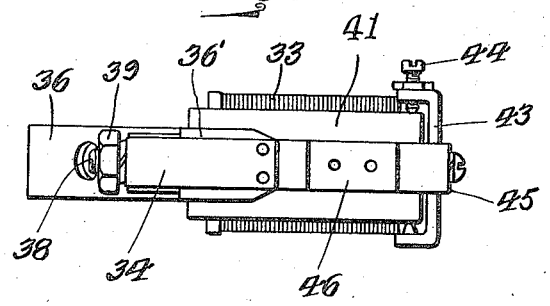
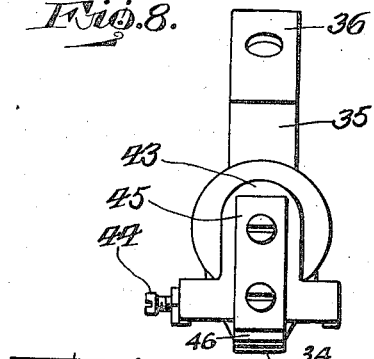
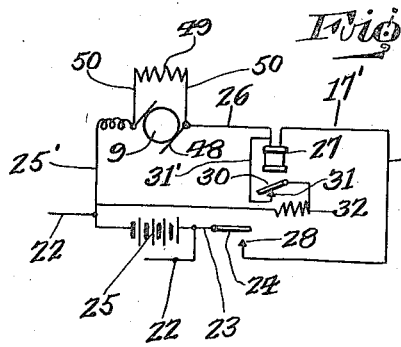
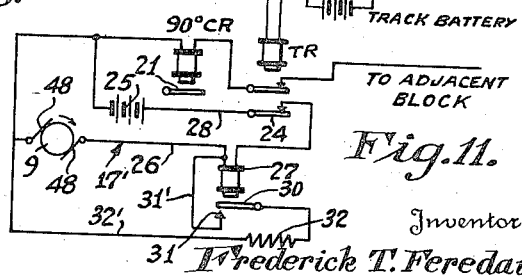
Inventor
Frederick T. Fereday
By Geo. P. Kimmel
Attorney

UNITED STATES PATENT OFFICE 2,038,482

ELECTRICAL SNUBBING MEANS

Frederick T. Fereday, St. Matthews, Ky., assignor to Peerless Manufacturing Corporation, Louisville, Ky., a corporation of Kentucky Application April 21, 1934, Serial No. 721,823

3 Claims. (Cl. 246—244)

This invention relates to an electrical snubbing means designed primarily for use in connection with the driving motor of a semaphore signal, but it is to be understood that a snubbing means, in accordance with this invention is not limited to its use in connection with the driving motor aforesaid as it is to be used in any connection for which it may be found applicable.

The primary object of the invention is to provide, in a manner as hereinafter set forth, a means of the class referred to for improving the operation of a driving motor when the latter operates in direction opposite to its direction of movement when making the object driven therefrom active.

A further object of the invention is to provide, in a manner as hereinafter set forth, a means of the class referred to in the form of a relay structure for association with an electric motor for improving the operation thereof.

A further object of the invention is to provide, in a manner as hereinafter set forth, a means of the class referred to in the form of a relay structure placed in series with a motor circuit for retarding or snubbing the operation of an electrical motor, in one direction of its two directions of movement without breaking the motor circuit.

A further object of the invention is to provide, in a manner as hereinafter set forth, a means of the class referred to in the form of a relay structure of very low resistance placed in series with a motor circuit for retarding or snubbing the operation of an electrical motor, in one direction of its two directions of movement without breaking the motor circuit and to overcome excessive sparking at the motor commutator.

A further object of the invention is to provide, in a manner as hereinafter set forth, an electrical motor snubbing or retarding means for the purpose referred to so constructed and arranged, so as to overcome excessive sparking at the motor commutator due to the fact that the operation of a signal or other device from the motor is intermittent allowing the motor to gain high speed between operations with the resultant electromotive force being large thereby causing heavy sparks on the commutator.

A further object of the invention, with respect to one application thereof is to provide, in a manner as hereinafter set forth, an electrical snubbing means for use in connection with the driving motor of a semaphore signal arm and with said means connected to the motor circuit and whereby the circuit of such means has no effect upon the normal operation of the motor when electricity is applied to bring the semaphore blade up to the caution (45°) position or to the clear (90°) position, and with said means acting upon the motor to retard the movement of the falling blade, thus the latter falls slowly and easily to the proper position without shock or strain to the semaphore signalling mechanism, more especially the motor of the latter.

A further object of the invention is to provide, in a manner as hereinafter set forth, a means for snubbing or retarding the operation in one direction of an electrical motor without the employment of moving parts, such as toggles and cams which break and get out of adjustment.

Further objects of the invention are to provide, in a manner as hereinafter set forth, a motor retarding or snubbing means which is simple in its construction, strong, durable, compact, readily installed for employment with the motor with which it is to be associated, thoroughly efficient in use, and comparatively inexpensive to manufacture.

In practical signal operation, there is an advantage in continuous dynamic braking during the downward movement of a semaphore arm, not evident from or obtainable by the prior known methods of semaphore arm braking. One of the prior known methods of braking is what is known as short terminal braking or intermittent braking. Signal blades are purposely unbalanced so that it is practically impossible for them to stick clear. The downward torque must be great enough to break down the momentum and any binding caused by freezing or otherwise, at the beginning of the downward stroke. And once the blade is in motion there is a tendency for it to continue in motion due to its momentum and to the force of gravity, and the few seconds required for continuous snubbing are not sufficient to overcome these forces, and to stop the blade before it reaches its stop. Thus briefly, if it is possible to get the blade started downwardly, the continuous snubbing will not prevent it from reaching the limit of its downward stroke. The advantages of continuous snubbing are:

1st. It prevents sudden shock to the signal mechanism and operating rod or wire.

2nd. In continuous snubbing the current generated by the motor is kept relatively small. This results in practically no arcing at the motor brushes, and thus the brushes and commutator are not injured.

3rd. For continuous snubbing the circuit breaker on the signal does not have to be adjusted so that the blade will be snubbed at exactly the right point. In the intermittent method the snubbing contact on the circuit breaker sometimes gets out of adjustment in which case the blade is not snubbed when it reaches the snubbing point and as a result the rapidly moving blade is not checked in its motion and the stop is struck so severely that the blade casting or the stop is sometimes broken. No adjustment of the signal circuit breaker is necessary for continuous snubbing because in this method the circuit breaker is not used.

To the above ends essentially and to others which may hereinafter appear, the invention consists of such parts, and such combination of parts which fall within the scope of the invention as claimed.

The invention is illustrated by way of example in connection with the electrical driving motor of a motor driven semaphore arm of a signaling apparatus.

In the drawings:—

Figure 1 is a diagrammatic view of a motor driven semaphore signal just about to complete a clear movement, and showing the adaptation therewith of an electrical snubbing means in accordance with this invention.

Figure 2 is a diagrammatic view of a motor driven semaphore signal just about to complete a stop movement, and showing the adaptation therewith of an electrical snubbing means in accordance with this invention.

Figures 5, 6, 7 and 8 are respectively a side elevation, a view looking toward one end, an inverted plan and a view looking towards the other end of a relay, forming an element of the electrical snubbing means in accordance with the invention.

Figure 10 is a diagram showing the modified form of motor circuit and the position of the latter and the position of the circuit of the electrical snubbing means when the parts of the signaling apparatus appear as shown in Figure 2.

Figure 11 is a diagram showing a conventional control circuit added to the circuit shown in Figure 3. The 90 degree control is hooked up to an adjacent block to transmit indications such as caution or clear, etc.

Figure 3:
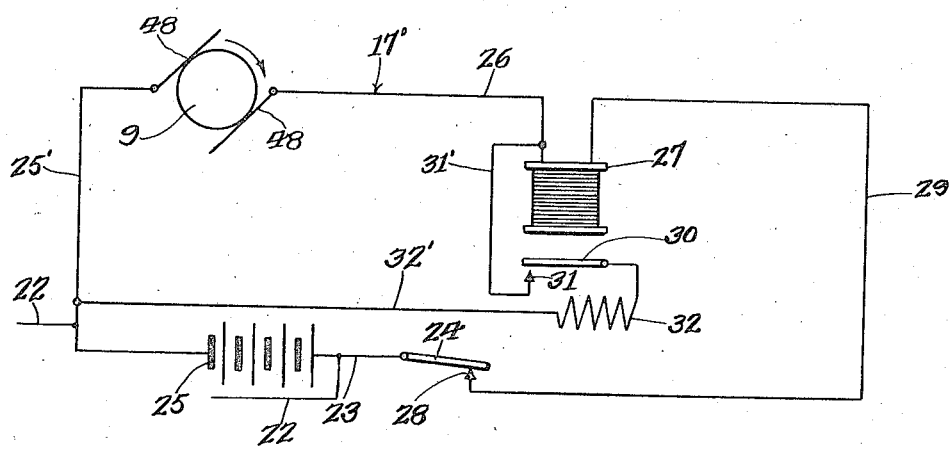
Figure 3 is a diagram showing the position of the motor circuit and the position of the circuit of the electrical snubbing means when the parts of the signaling apparatus appear as shown in Figure 1.

With reference to Figures 1 and 2 there is illustrated a motor 9, having its shaft 10 provided with a pinion 11, and meshing with the latter is a train of gears 12 including a quadrant gear 12' which is an integral part of a lever arm 13 and provides for the revolving of the latter. The gear 12' is pivotally supported as at 13'. Suitably attached to the outer end of lever arm 13 is one end of a pull wire or rod 14 employed for operating a lever arm 15 which is secured to and functions to shift a semaphore blade 16 to caution or clear position. The lever arm 15 is pivotally supported as at 15'. The foregoing elements are of known construction, and their arrangement is such that when motor 9 is rotated in the direction of the arrow 17 by closing a motor circuit 17', the blade 16 may be shifted 90° from the 0° position, shown in Figure 2 to the clear position shown in Figure 1. When the blade 16 is shifted to the clear or to the 45° caution positions it is usually held in one of these positions for some time. This is usually accomplished by means of a holding mechanism consisting of a notched friction disc 18 secured to one end of the shaft 10, and which is adapted to engage with the nose 19 of an arm 19' in the form of a pivoted bell crank lever. The arm 19' is forced in a direction to have its nose 19 engage in a notch of disc 18 by the action of an electromagnet 20 energized by a battery to be referred to when a contact 21 is closed. The contact 21 is interposed in a circuit 22 for the magnet 20. The contact 21 is generally controlled by a relay, not shown in the track movements. The foregoing arrangement of elements is well known.

When the contact 21 is opened by a proper train movement, the arm 19' falls away from disc 18 as shown in Figure 2, and the weight of the blade 16 is able to rotate the train of gears 12' and the motor 9 in the direction of the arrow 17''. When the motor 9 is operated in this manner it generates an appreciable electric motive force which increases with its speed. If no retarding or snubbing device is provided, the blade 16 gains in speed as it falls and will very likely break something when it reaches the 0° or stop position. Therefore, this type of signal is always equipped with some form of snubbing or slowing device, but the devices now in general use for such purpose have not been entirely satisfactory. Some of the faults found are: excessive sparking of the motor commutator due to the fact that the operation of the device is intermittent allowing the motor to gain a high speed between operations and the resultant electromotive force is large causing heavy sparks on the commutator; moving parts, such as toggles and cams which break and get out of adjustment; and the breaking of the motor circuit by a contact which sometimes fails to close, and if this happens the motor cannot be run and the signal blade cannot be moved upwardly.

The electrical snubbing means, in accordance with this invention is placed in series with the motor circuit 17', and the latter includes a circuit connection 23 leading from a contact member 24 to a battery 25, a circuit connection 25' leading from battery 25 to motor 9, a circuit connection 26 leading from motor 9 to a very low resistance relay coil 27, a contact 28 for engagement by member 24 to close the motor circuit and a circuit conductor 29 leading from coil 27 to contact 28. The battery 25 is interposed in the magnet circuit 22.

The electrical snubbing means includes the relay coil 27, a contact member 30 to engage a contact 31, a circuit connection 31' leading from circuit connection 26 to contact 31, a resistance 32 electrically connected to member 30, a circuit connection 32' leading from resistance 32 to circuit connection 25'.

Figure 4:
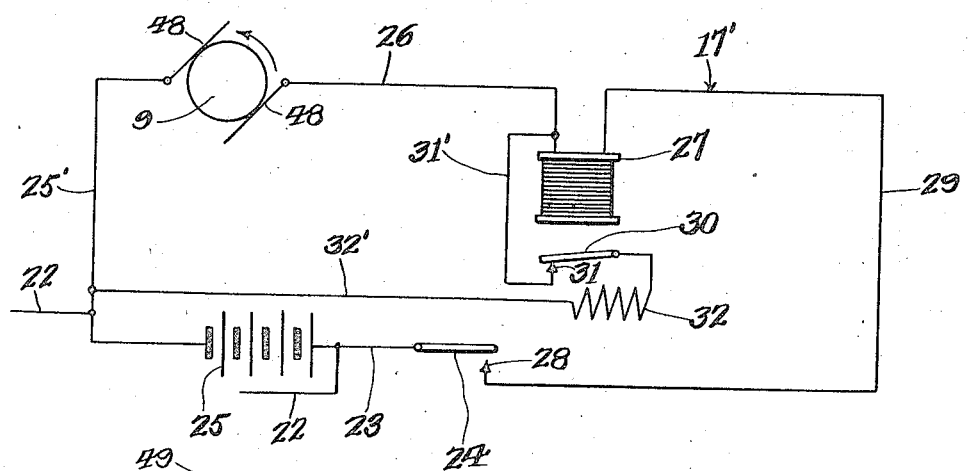
Figure 4 is a view similar to Figure 3, showing the position of the motor circuit and the position of the circuit of the electrical snubbing means when the parts of the signaling apparatus appear as shown by Figure 2.

With reference to Figures 5, 6, 7 and 8 the relay 27 comprises a magnet coil 33, an L-shaped contact spring 34 consisting of the arms 34', 34'', an angle-shaped conducting element formed of an intermediate portion 35 and a pair of end portions 36, 36'. The portions 35, 36' constitute the circuit connection 31' shown in Figures 3 and 4. The portion 36 forms a continuation of the circuit connection 26 shown in Figures 3 and 4. The portion 35 is interposed between the coil 33 and spring 34. The portion 36 is extended from coil 33. A pair of spaced insulating studs 37 is interposed between the arm 34' of spring 34 and portion 35. The terminals 38 are extended through the studs 37 and the arm 34' of the spring 34. Nuts and washers 39, 40 respectively are mounted on terminals 38. The washers abut the arm 34' of the spring 34. A yoke 41 for the coil 33 is connected to the latter by holdfast means 42. The portion 35 of the conducting element is interposed between a part of the yoke 41 and the arm 34' of spring 34. The portion 36' of the conducting piece is interposed between the arm 34'' of the spring 34 and the base of yoke 41. There is associated with the coil 33 an armature 43 having adjustable trunnion screws 44 therefor which engage in the sides of the base of yoke 41 at one end of the latter. Carried by the armature 43 is a contact arm 45 of angled contour. The arm 45 includes an extension 46 for moving the arm 34'' of spring 34 clear of a contact 47 on the portion 36' of the conducting element when the relay circuit is closed. The contact 47 is the contact 31 shown in Figures 3 and 4. The spring 34 is the contact 32 shown in Figures 3 and 4. The coil 33 corresponds to the coil shown in Figures 3 and 4.

The 90 degree control relay referred to in Figure 11 as 90° C. R. is hooked up to an adjacent block to transmit indications such as caution, clear, etc. The relay in Figure 11 identified as TR is the conventional track relay shown connected with the track rails.

The operation of the electrical snubbing means, in accordance with this invention is as follows:

When the blade 16 is moving upwardly to a caution or to a clear position, the contact member 24, which is indirectly controlled by a track relay of another signal mechanism is closed and it allows current from the operating battery 25 to flow through the motor 9 rotating the latter, thence through the relay 27 causing it to pick up and open its contact member 30 and thence through contact member 24 back to the opposite side of battery 25. The contact member 24 is closed only when the motor 9 is moving the blade 16 upwardly. Therefore, when the blade 16 is dropped, by the releasing of the holding magnet 20, contact member 24 will be in open position. As blade 16 drops, the motor 9 is rotated and generates an electric current which will flow through circuit connections 26, 30, 31' through the resistance 32 and circuit connections 25', 32' back to the other side of the motor, but the current cannot flow through the relay 27 because contact member 24 is open, therefore, the contact member 30 will remain closed. The circuit connections 26, 31', 32' and 25' and the resistance 32, the latter being relatively low in electrical resistance form a shunt around the motor, which is now acting as a generator, putting a heavy load upon it, which tends to stop its rotation, thus it will rotate slowly and generate only a small current. The resistance 30 is used because the circuit connections 25', 26, 31' and 32' alone would form such a low resistance shunt that the motor 9 would be rotated too slowly and the time required to bring the signal to the proper position would be excessively long.

Figure 9:
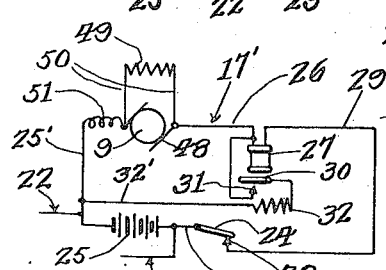
Figure 9 is a diagram showing a modified form of motor circuit and the position of the latter and the position of the circuit of the electrical snubbing means when the parts of the signaling apparatus appear as shown in Figure 1.

Now if one or both of the motor brushes 48 be held from electrical contact with the commutator by some foreign substance, as a small grain of sand, or an extremely dirty commutator, the snubbing relay of the electrical snubbing means would become a vibrator when the motor current is applied, and as the motor current is relatively large, the contact of the snubbing relay would very likely be badly burned because of this excessive operation. A means to overcome the foregoing objection is shown in Figures 9 and 10, and with reference thereto a relatively high resistance 49 is employed and the leads 50 thereof extend directly to the motor brushes 48. The field of the motor 9 is designated 51. Otherwise than as stated the arrangement of the circuits shown in Figures 9 and 10 is the same as that shown in Figure 3. For an 8 volt. D. C. motor the resistance 49 should be about 30 ohms.

With respect to Figures 9 and 10 the principle involved is that should either or both of the brushes fail to make contact with the commutator, the circuit through the motor 9 would not be opened and thus the coil 27 would not become de-energized and its contact member 30 could not engage the contact 31, and on the other hand, the resistance 49 is high enough so that it does not shunt an appreciable amount of current from the motor when it is being driven from battery 25.

The snubbing action is with respect to the blade that it controls the gravitation of the latter to be slow whereby the blade starts slowly and continues in a like manner, at a uniform speed, throughout its movement downwardly, and consequently the electro-motive force generated is correspondingly low and practically no arcing occurs at the commutator.

The relay coil 27 placed in series in the motor circuit is of very low resistance.

What I claim is:—

1. In an electric signaling apparatus, a movable signaling member, an electric dynamo for actuating said member in one direction, mechanical transmission means connected between said dynamo and signaling member, said member adapted to move by gravity in its reverse direction, a source of energy for said electric dynamo connected in electrical circuit therewith, a circuit controller and a relay in series in said electrical circuit, an armature controlled by said relay, said circuit controller being normally in open position and adapted to be closed for operating said dynamo as a motor to raise said member in said one direction, means for holding said member at the end of its movement in said one direction, releasing means for said holding means to permit the reverse movement of said member by gravity and the consequent operation of said dynamo as a generator, a shunt circuit around said relay, circuit controller and source of energy effected by said armature in its inoperative position, said shunt circuit including a resistance and providing a load for the regenerative braking of said dynamo throughout the complete course of movement of said member to its limit position.

2. The electric signaling apparatus as set forth in claim 1 wherein the means for holding the signaling member at said end of its movement in said one direction comprises a latch formed as an armature of an auxiliary relay, said relay being in electrical circuit with a supplemental circuit controller and said source of energy for said electric dynamo.

3. The electric signaling apparatus as set forth in claim 1 wherein a high resistance is connected across the terminals of said electric dynamo, said resistance having a negligible effect at the operation of said dynamo as a motor but providing a discharge load for the dynamo at the operation thereof as a generator.

FREDERICK T. FEREDAY.